(12) United States Patent
Holmes et al.

(10) Patent No.: US 9,062,719 B2
(45) Date of Patent: Jun. 23, 2015

(54) ELECTRICALLY ACTUATED ROTATING BAND TORQUE TRANSMITTING MECHANISM FOR HYBRID AND OTHER TRANSMISSIONS

(71) Applicant: GM GLOBAL TECHNOLOGY OPERATIONS LLC, Detroit, MI (US)

(72) Inventors: Alan G. Holmes, Clarkston, MI (US); Anthony L. Smith, Troy, MI (US); Scott H. Wittkopp, Ypsilanti, MI (US); Anthony J. Corsetti, Rochester Hills, MI (US); Scott William Heitzenrater, Orion, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 63 days.

(21) Appl. No.: 13/939,269

(22) Filed: Jul. 11, 2013

(65) Prior Publication Data
US 2015/0014115 A1    Jan. 15, 2015

(51) Int. Cl.
*F16D 13/08* (2006.01)
*F16D 27/02* (2006.01)
*F16D 49/02* (2006.01)

(52) U.S. Cl.
CPC .............. *F16D 13/08* (2013.01); *F16D 27/02* (2013.01); *F16D 49/02* (2013.01)

(58) Field of Classification Search
CPC ....... F16D 13/08; F16D 27/02; F16D 27/025; F16D 49/20; F16D 2027/005; F16D 41/203
See application file for complete search history.

(56) References Cited

U.S. PATENT DOCUMENTS

| | | | |
|---|---|---|---|
| 5,127,502 A * | 7/1992 | Billings | 192/84.81 |
| 5,952,750 A * | 9/1999 | Yokoyama et al. | 310/78 |
| 6,059,086 A * | 5/2000 | Studer | 192/56.2 |
| 7,766,774 B2 * | 8/2010 | Antchak et al. | 474/74 |
| 2013/0092501 A1 * | 4/2013 | Schneider et al. | 192/41 S |

* cited by examiner

*Primary Examiner* — Rodney H Bonck
*Assistant Examiner* — Lillian Nguyen
(74) *Attorney, Agent, or Firm* — Quinn Law Group, PLLC (57) ABSTRACT

A torque transmitting mechanism includes a drum attached to one of a first member and a second member, and a shell attached to another of the first member and the second member. The drum and the shell are concentrically disposed about a longitudinal axis, with the shell concentrically disposed about the drum. An electric motor includes a stator, and a first rotor rotatable about the longitudinal axis relative to the stator. A band is coupled to the shell, wrapped around the drum between four and twelve complete revolutions, and includes a first end attached to the first rotor for rotation with the first rotor. The band includes a second end attached to a reaction member. Rotation of the first rotor tightens the band against the drum to bias the drum against the shell, to transmit torque between the first member and the second member.

19 Claims, 4 Drawing Sheets

ELECTRICALLY ACTUATED ROTATING BAND TORQUE TRANSMITTING MECHANISM FOR HYBRID AND OTHER TRANSMISSIONS

TECHNICAL FIELD

The invention relates to a rotating band torque transmitting mechanism for a transmission of a vehicle.

BACKGROUND

Vehicle transmissions typically include several torque transmitting devices, such as clutches and brakes, for enabling and/or disabling torque communication between various members and/or components of the transmission. The torque transmitting devices typically include an electrical solenoid actuated system, or more commonly, a hydraulic system that circulates a hydraulic fluid to the various torque transmitting devices.

SUMMARY

A transmission for a vehicle is provided. The transmission includes a housing. A first member and a second member are supported by the housing and aligned with each other along a longitudinal axis. At least one of the first member and the second member is rotatable about the longitudinal axis relative to the housing. A torque transmitting mechanism selectively interconnects the first member and the second member for torque transmission therebetween. The torque transmitting mechanism includes a drum attached to one of the first member and the second member. The drum is concentrically disposed about the longitudinal axis. A shell is attached to another of the first member and the second member. The shell is concentrically disposed about the longitudinal axis and the drum. The shell is radially spaced from the drum relative to the longitudinal axis. The torque transmitting mechanism includes an electric motor having a stator fixed in position relative to the housing, and a rotor rotatable about the longitudinal axis relative to the stator. A band includes a first end that is coupled to either the shell and the rotor, or the drum and the rotor. The band includes a second end that is coupled to either the shell and the rotor, or the drum and the rotor. The band is wrapped to define at least one wrap that completely encircles the drum. Rotation of the rotor in response to an electric current applied to the stator moves the at least one wrap of the band into frictional engagement with one of the drum or the shell to transmit torque between the first member and the second member.

A torque transmitting mechanism for selectively interconnecting a first member and a second member of a transmission, for torque transmission therebetween, is also provided. The torque transmitting mechanism includes a drum attached to one of the first member and the second member. The drum is concentrically disposed about a longitudinal axis. A shell is attached to another of the first member and the second member. The shell is concentrically disposed about the longitudinal axis and the drum. The shell is radially spaced from the drum relative to the longitudinal axis. An electric motor includes a stator, and a rotor rotatable about the longitudinal axis relative to the stator. A rotor connector is attached to and rotatable with the rotor about the longitudinal axis. A band includes a first end that is coupled to both the shell and the rotor, and a second end that is coupled to both the shell and the rotor. The band is wrapped around the drum to define between 4 and 12 complete wraps. Rotation of the rotor in response to an electric current applied to the stator moves the band into frictional engagement with one of the drum or the shell to transmit torque between the first member and the second member.

Accordingly, the multi-wrap band is actuated and directly controlled by the electric motor. When a current is applied to the electric motor, the rotor rotates around the longitudinal axis, which either winds the multi-wrap band around the drum, or un-winds the multi-wrap band to engage the shell, thereby coupling the first member to the second member. The torque transmitting mechanism may be configured to wind-up the multi-wrap band to achieve frictional engagement with the drum, or un-wind the multi-wrap band to achieve frictional engagement with the shell. If one of the first member and the second member is a non-rotating member, then the torque transmitting mechanism operates as a brake. In contrast, if both of the first member and the second member are rotating members, then the torque transmitting mechanism operates as a clutch. The torque transmitting mechanism requires little electrical energy to actuate the electric motor, and couple the first member and the second member together in torque transmission therebetween.

The above features and advantages and other features and advantages of the present invention are readily apparent from the following detailed description of the best modes for carrying out the invention when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the invention, as defined by the appended claims. Furthermore, the invention may be described herein in terms of functional and/or logical block components and/or various processing steps. It should be realized that such block components may be realized by any number of hardware, software, and/or firmware components configured to perform the specified functions.

Figure 1:
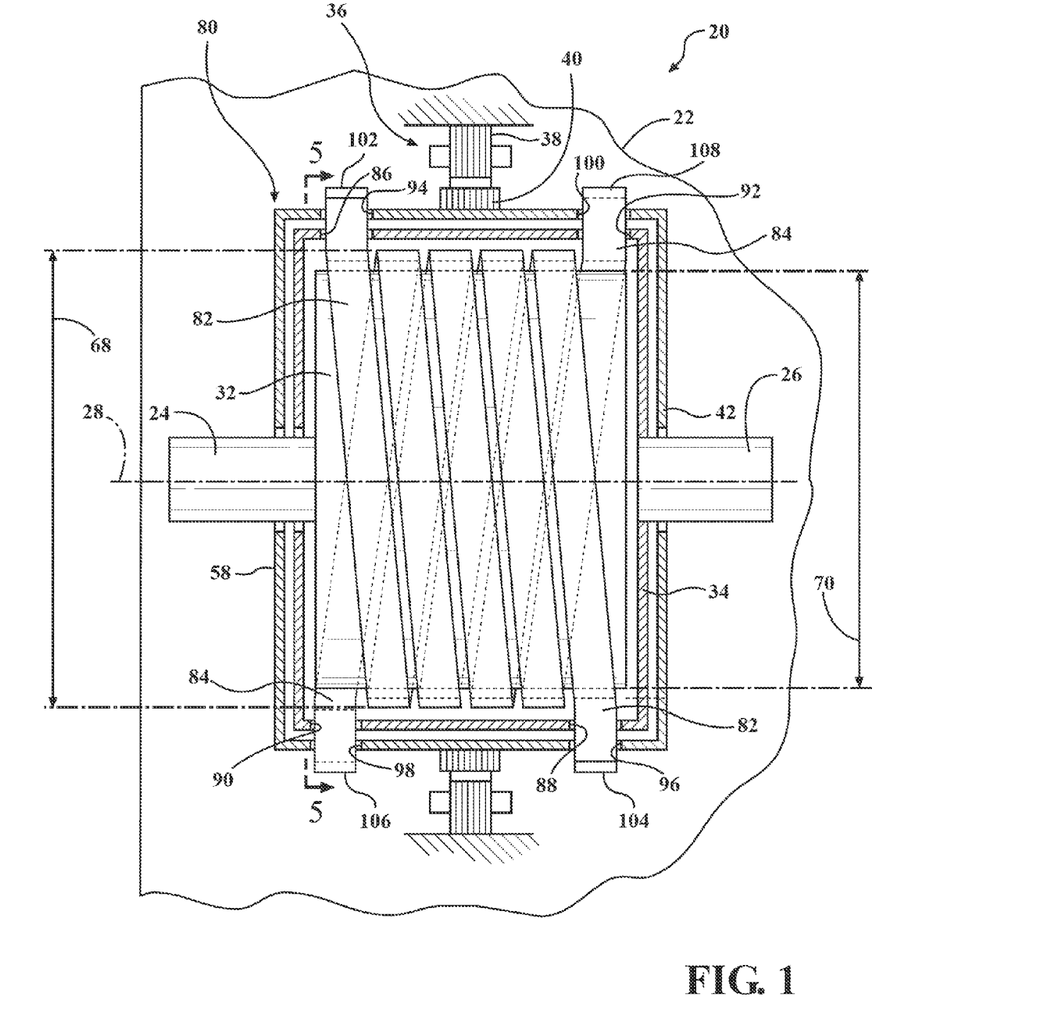
FIG. 1 is a schematic cross sectional view cut along a longitudinal axis of a transmission showing a torque transmitting mechanism.

Referring to the Figures, wherein like numerals indicate like parts throughout the several views, a transmission is generally shown at 20 in FIG. 1. The transmission 20 may be configured as an automatic transmission for a hybrid vehicle, powered by a combination of power sources, such as but not limited to one or more electric motors and an internal combustion engine, or may be configured as an automatic transmission for a vehicle powered by an internal combustion engine only.

Referring to FIG. 1, the transmission 20 includes a housing 22, which supports the various components of the transmission 20. The housing 22 may be shaped in any suitable size and/or configuration capable of meeting the design and packaging restraints of the vehicle. The transmission 20 includes at least a first member 24 and a second member 26. The first member 24 and the second member 26 are each supported by the housing 22 and aligned with each other along a longitudinal axis 28. At least one of the first member 24 and the second member 26 is rotatable about the longitudinal axis 28 relative to the housing 22. The first member 24 and the second member 26 are shown in FIG. 1 as shafts that extend along the longitudinal axis 28. However, the first member 24 and the second member 26 may each be defined as some other component of the transmission 20, and should not be limited to a shaft as shown in FIG. 1.

The transmission 20 includes a torque transmitting mechanism 80 that selectively connects the first member 24 and the second member 26 for torque transmission 20 therebetween. If both the first member 24 and the second member 26 are rotatable about the longitudinal axis 28, then the torque transmitting mechanism 80 may operate as a clutch, to selectively couple the rotatable first member 24 with the rotatable second member 26. However, if only one of the first member 24 and the second member 26 are rotatable about the longitudinal axis 28, then the torque transmitting mechanism 80 may operate as a brake, to selectively couple the rotatable member with the non-rotatable member.

The torque transmitting member includes a drum 32 attached to one of the first member 24 and the second member 26, and a shell 34 attached to another of the first member 24 and the second member 26. As shown in FIG. 1, the drum 32 is attached to the first member 24, and the shell 34 is attached to the second member 26. However, it should be appreciated that the relative positions of the drum 32 and the shell 34 may be reversed, with the drum 32 being attached to the second member 26, and the shell 34 being attached to the first member 24. The drum 32 is concentrically disposed about the longitudinal axis 28. The shell 34 is concentrically disposed about the longitudinal axis 28 and the drum 32. The shell 34 is radially spaced away from the drum 32 relative to the longitudinal axis 28. Accordingly, the shell 34 is spaced farther from the longitudinal axis 28 than the drum 32. The shell 34 is spaced from the drum 32 to define a gap between the shell 34 and the drum 32.

An electric motor 36 is supported by the housing 22, and operable to engage and disengage the torque transmitting mechanism 80. The electric motor 36 includes a stator 38 that is fixed in position relative to the housing 22, and a rotor 40 that is rotatable about the longitudinal axis 28 relative to the stator 38. The rotor 40 rotates about the longitudinal axis 28 in response to an electric current applied to the stator 38 of the electric motor 36. The rotor 40 and the stator 38 may include any style and/or configuration, and be manufactured from any materials suitable for use within the transmission 20.

A rotor connector 42 is attached to and rotatable with the rotor 40 about the longitudinal axis 28. The rotor connector 42 may be configured in any suitable manner, and be manufactured from any suitable material. For example, and as shown in the Figures, the rotor connector 42 is shown as a cylinder having end walls, and is manufactured from steel. The rotor connector 42 is concentrically disposed about the longitudinal axis 28 and the shell 34. The rotor connector 42 is radially spaced from the shell 34 relative to the longitudinal axis 28. Accordingly, the rotor connector 42 is spaced farther from the longitudinal axis 28 than the shell 34. The rotor connector 42 is spaced from the shell 34 to define a gap between the rotor connector 42 and the shell 34.

Figure 2:
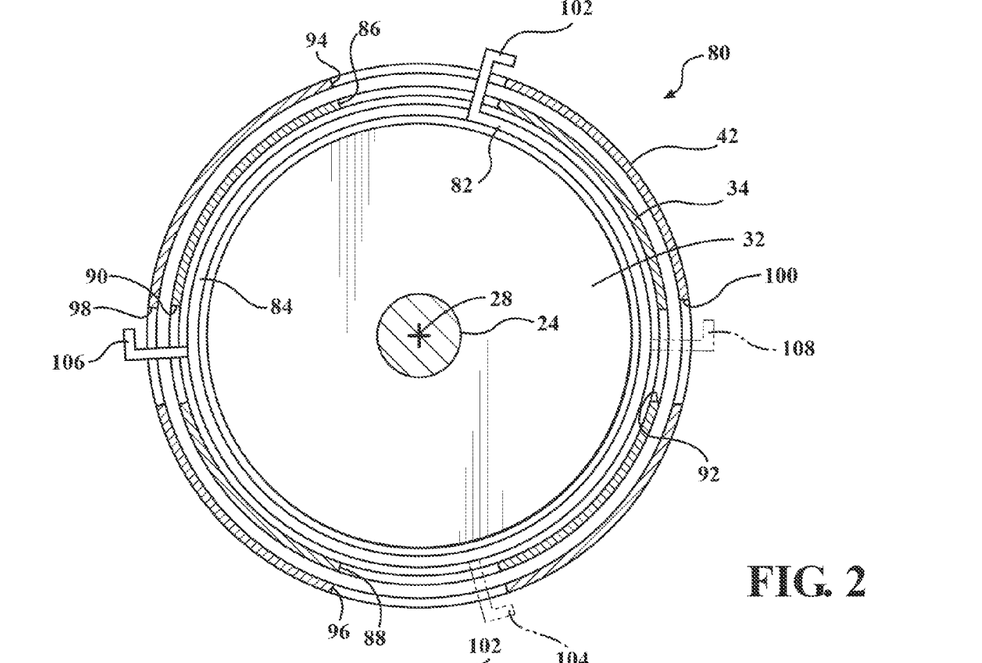
FIG. 2 is a schematic cross sectional view cut perpendicular to the longitudinal axis showing the torque transmitting mechanism in a disengaged state.
Figure 3:
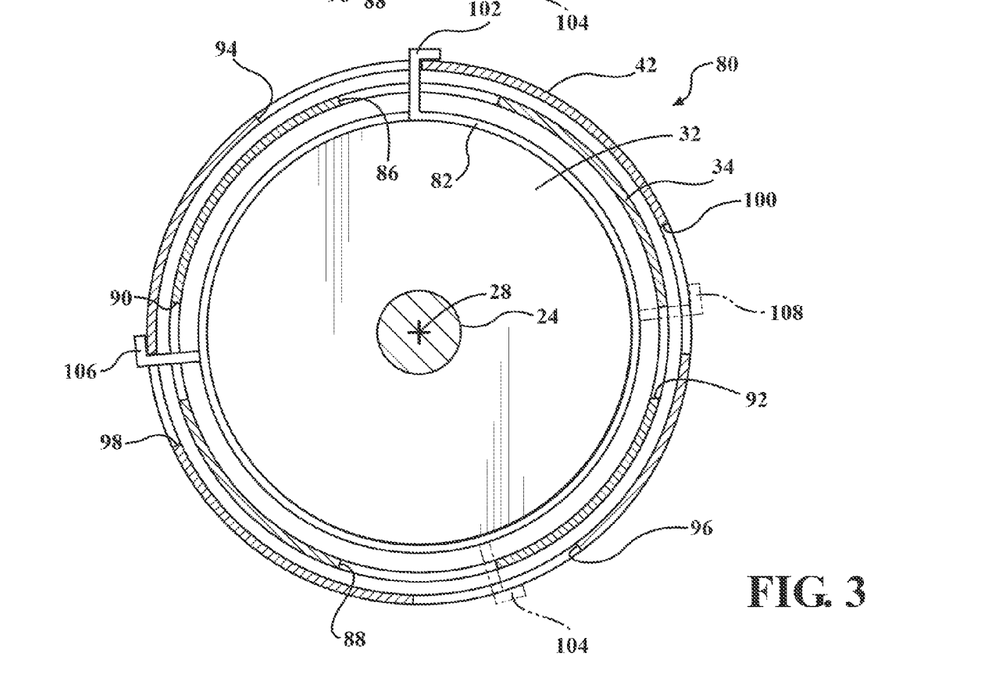
FIG. 3 is a schematic cross sectional view cut perpendicular to the longitudinal axis showing the torque transmitting mechanism in an engaged state.

At least one band is coupled to both the shell 34 and to the rotor 40. As shown in FIGS. 1 through 3, the torque transmitting mechanism 80 includes a first band 82 and a second band 84. However, it should be appreciated that the torque transmitting mechanism 80 may include only a single band, or more than the two exemplary bands shown and described herein. The first band 82 and the second band 84 are substantially identical, and are intertwined in a double helix arrangement in a manner configured to equalize side and twisting forces in the torque transmitting mechanism 80. For example, referring to a first axial end 58 of the torque transmitting mechanism 80, shown at the left side of the page of FIG. 1, the force form the first band 82 is directed into the page of FIG. 1, whereas the force from the second band 84 is directed out of the page of FIG. 1. The first band 82 and the second band 84 each includes and are manufactured from a metal, such as but not limited to spring steel. The first band 82 and the second band 84 may include a frictional material disposed in an interior surface of the first band 82 and the second band 84 respectively, for engaging the drum 32 in frictional engagement as described in greater detail below.

The first band 82 includes a first end 102 and a second end 104, and the second band 84 includes a first end 106 and a second end 108. The first end 102 of the first band 82 and the first end 106 of the second band 84 are each coupled to both the shell 34 and the rotor 40. Similarly, the second end 104 of the first band 82 and the second end 108 of the second band 84 are each coupled to both the shell 34 and the rotor 40.

The shell 34 defines a first shell slot 86, a second shell slot 88, a third shell slot 90, and a fourth shell slot 92. Each of the first shell slot 86, the second shell slot 88, the third shell slot 90, and the fourth shells lot 92 extend angularly about the longitudinal axis, and are disposed in a radially outer wall of the shell 34. The rotor connector 42 defines a first rotor slot 94, a second rotor slot 96, a third rotor slot 98 and a fourth rotor slot 100. Each of the first rotor slot 94, the second rotor slot 96, the third rotor slot 98, and the fourth rotor slot 100 extend angularly about the longitudinal axis, and are disposed in a radially outer wall of the rotor connector 42.

The first end 102 of the first band 82 extends through the first shell slot 86 and the first rotor slot 94 to couple the first end 102 of the first band 82 to the shell 34 and the rotor 40. The second end 104 of the first band 82 extends through the second shell slot 88 and the second rotor slot 96 to couple the second end 104 of the first band 82 to the shell 34 and the rotor 40. The first end 106 of the second band 84 extends through the third shell slot 90 and the third rotor slot 98 to couple the first end 106 of the second band 84 to the shell 34 and the rotor 40. The second end 108 of the second band 84 extends through the fourth shell slot 92 and the fourth rotor slot 100 to couple the second end 108 of the second band 84 to the shell 34 and the rotor 40. The first ends 102, 106 and the second ends 104, 108 of the first band 82 and the second band 84 are bent to form an approximate one hundred eighty degree bend, substantially defining a hooked end to prevent the first band 82 and/or the second band 84 from withdrawing from the shell slots 86, 88, 90, 92 and the rotor slots 94, 96, 98, 100.

The first shell slot 86 and the first rotor slot 94 are at least partially overlapping. The second shell slot 88 and the second rotor slot 96 are at least partially overlapping. The third shell slot 90 and the third rotor slot 98 are at least partially overlapping. Similarly, the fourth shell slot 92 and the fourth rotor slot 100 are at least partially overlapping. The first shell slot 86 and the first rotor slot 94, are disposed adjacent the first axial end 58 of the torque transmitting mechanism 80 along the longitudinal axis 28, and the second shell slot 88 and the second rotor slot 96 are disposed adjacent the second axial end 60 of the torque transmitting mechanism 80 along the longitudinal axis 28. The third shell slot 90 and the third rotor slot 98 are disposed adjacent the first axial end 58 of the torque transmitting mechanism 80, and the fourth shell slot 92 and the fourth rotor slot 100 are disposed adjacent the second axial end 60 of the torque transmitting mechanism 80.

The first band 82 and the second band 84 are wrapped around the drum 32 to each define at least one complete wrap that completely encircles the drum 32. Preferably, the first band 82 and the second band 84 are each wrapped around the drum 32 between 4 and 12 complete revolutions to define between 4 and 12 complete wraps, which completely encircle the drum 32. The first band 82 and the second band 84 each move simultaneously between an engaged state in which the first band 82 and the second band 84 are tightened against the drum 32 to engage the drum 32 in frictional engagement, and a disengaged state in which the first band 82 and the second band 84 are loosely wrapped around the drum 32 and the drum 32 is free to rotate relative to the first band 82 and the second band 84 respectively.

The first band 82 includes a length that is measured between the first end 102 of the first band 82 and the second end 104 of the first band 82. The length of the first band 82 provides at least two millimeters (2 mm) of clearance between each wrap of the first band 82 and the drum 32 when the first band 82 is in the disengaged state in which the first band 82 is not biased or tightened against the drum 32. As such, when the first band 82 is disposed in the disengaged state, each wrap of the first band 82 defines a diameter 68 that is at least 2 mm larger than a diameter 70 of the drum 32. Similarly, the second band 84 includes a length that is measured between the first end 106 of the second band 84 and the second end 108 of the second band 84. The length of the second band 84 provides at least two millimeters (2 mm) of clearance between each wrap of the second band 84 and the drum 32 when the second band 84 is in the disengaged state in which the second band 84 is not biased or tightened against the drum 32. As such, when the second band 84 is disposed in the disengaged state, each wrap of the second band 84 defines a diameter 68 that is at least 2 mm larger than a diameter 70 of the drum 32.

The first band 82 and the second band 84 rotate with the shell 34 and one of the first member 24 or the second member 26 when the first band 82 and the second band 84 are disposed in the disengaged state, in which the first band 82 and the second band 84 are not biased against the drum 32. Because the shell 34 is shown attached to the second member 26 in FIG. 1, the first band 82 and the second band 84 rotate with the second member 26 and the shell 34 when the first band 82 and the second band 84 are disposed in the disengaged state.

Referring to FIGS. 1 and 2, the bands 82, 84 is shown in the disengaged state. Referring to FIG. 3, in response to an electric current applied to the stator 38, the rotor 40 and the rotor connector 42 rotate about the longitudinal axis 28. The rotor connector 42 rotates relative to the first ends 102, 104 and the second ends 104, 108 of the bands 82, 84 until one of the first ends 102, 106 and the second ends 104, 108 contacts and engages an end of one of the rotor slots 94, 96, 98, 100, at which time the first ends 102, 106 or the second ends 104, 108 rotate with the rotor connector 42.

As shown in FIG. 3, the first end 102 of the first band 82 contacts and engages the first rotor slot 94, and the first end 106 of the second band 84 contacts and engages the third rotor slot 98. The first ends 102, 106 and/or the second ends 104, 108 of the first band 82 and the second band 84 rotate with the rotor connector 42 until they contact and engage an end of the shell slots 86, 88, 90, 92, at which time the shell 34 rotates with the rotor connector 42. As shown in FIG. 3, the second 104 of the first band 82 contacts and engages the fourth shell slot 92, and the second end 108 of the second band 84 contacts and engages the third shell slot 90. As the rotor connector 42 continues to rotate, the first band 82 and the second band 84 are wound tightly against the drum 32 to form the torque transmitting engagement between the drum 32 and the shell 34 through the first band 82 and the second band 84. The electric motor 36 must exert little force to the first band 82 and/or the second band 84 to maintain the frictional engagement between the bands 82, 84 and the drum 32, thereby requiring little energy to maintain the torque transmitting connection between the first member 24 and the second member 26.

While the torque transmitting mechanism 80 is described above as operating to tighten the first band 82 and the second band 84 around the drum in response to the electric current, i.e., the electric motor 36 winds the bands 82, 84 tightly against the drum, it should be appreciated that the torque transmitting mechanism 80 may be configured such that the electric motor 36 un-winds the bands 82, 84 from frictional engagement with the drum 32 in response to the electric current. As such, the bands 82, 84 would naturally be disposed in the engaged state, and would be moved into the disengaged state in response to the electric current being applied to the electric motor 36.

Figure 4:
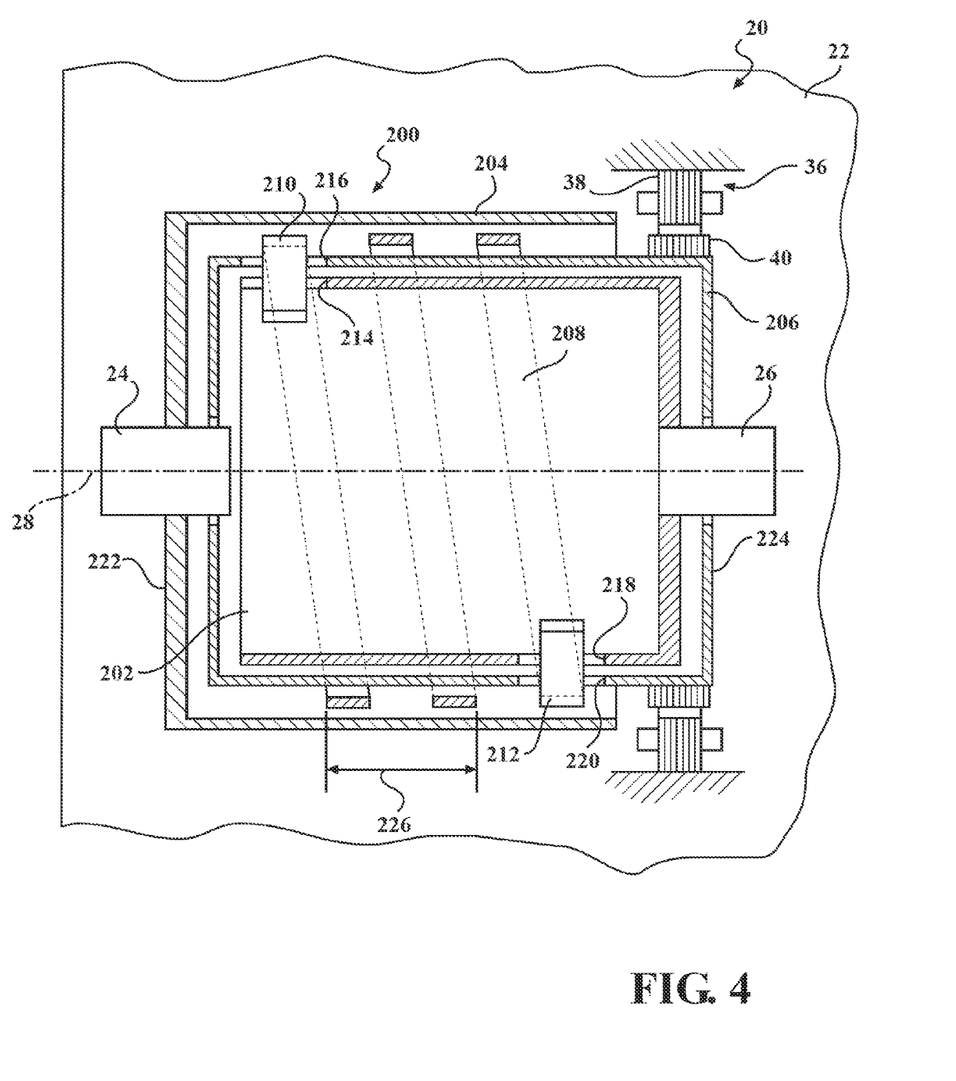
FIG. 4 is a schematic cross sectional view cut along the longitudinal axis of a first alternative embodiment of the torque transmitting mechanism.
Figure 5:
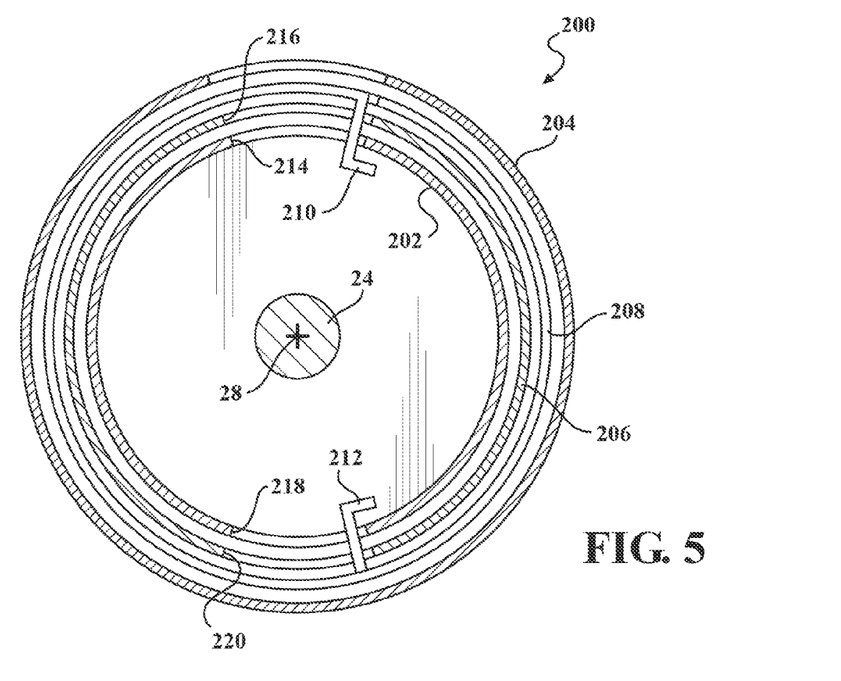
FIG. 5 is a schematic cross sectional view cut perpendicular to the longitudinal axis showing the first alternative embodiment of the torque transmitting mechanism in the disengaged state.
Figure 6:
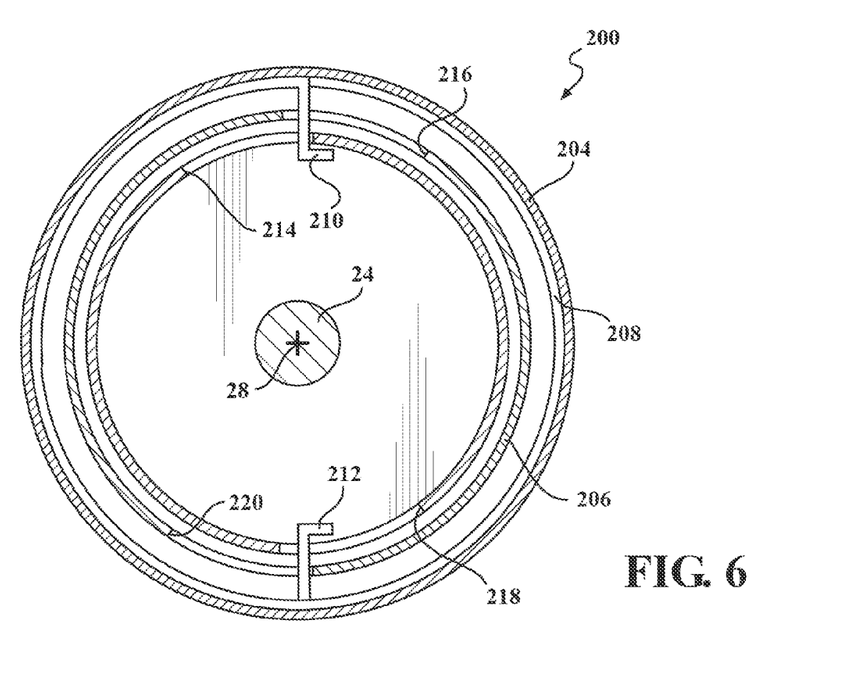
FIG. 6 is a schematic cross sectional view cut perpendicular to the longitudinal axis showing the first alternative embodiment of the torque transmitting mechanism in the engaged state.

Referring to FIGS. 4-6, an alternative embodiment of the torque transmitting mechanism is generally shown at 200. Features of the torque transmitting mechanism 200 that are identical or similar to the features of the torque transmitting mechanism 30 described above, are identified with the same references numerals.

The torque transmitting member includes a drum 202 attached to one of the first member 24 and the second member 26, and a shell 204 attached to another of the first member 24 and the second member 26. As best shown in FIG. 4, the drum 202 is attached to the second member 26, and the shell 204 is attached to the first member 24. However, it should be appreciated that the relative positions of the drum 202 and the shell 204 may be reversed, with the drum 202 being attached to the first member 24, and the shell 204 being attached to the second member 26. The drum 202 is concentrically disposed about the longitudinal axis 28. The shell 204 is concentrically disposed about the longitudinal axis 28 and the drum 202. The shell 204 is radially spaced away from and outward of the drum 202 relative to the longitudinal axis 28. Accordingly, the shell 204 is spaced farther from the longitudinal axis 28 than the drum 202. The shell 204 is spaced from the drum 202 to define a gap between the shell 204 and the drum 202.

An electric motor 36 is supported by the housing 22, and operable to engage and disengage the torque transmitting mechanism 200. The electric motor 36 includes a stator 38 that is fixed in position relative to the housing 22, and a rotor 40 that is rotatable about the longitudinal axis 28 relative to the stator 38. The rotor 40 rotates about the longitudinal axis 28 in response to an electric current applied to the stator 38 of the electric motor 36. The rotor 40 and the stator 38 may include any style and/or configuration, and be manufactured from any materials suitable for use within the transmission 20.

A rotor connector 206 is attached to and rotatable with the rotor 40 about the longitudinal axis 28. The rotor connector 206 may be configured in any suitable manner, and be manufactured from any suitable material. For example, and as shown in the Figures, the rotor connector 206 is shown as a cylinder having end walls, and is manufactured from steel. The rotor connector 206 is concentrically disposed about the longitudinal axis 28, and is disposed between the drum 202 and the shell 204. The rotor connector 206 is radially spaced outward of the drum 202 relative to the longitudinal axis 28, and is radially spaced inward of the shell 204 relative to the longitudinal axis 28. Accordingly, the rotor connector 206 is spaced farther from the longitudinal axis 28 than the drum 202, but nearer the longitudinal axis 28 than the shell 204. The rotor connector 206 is spaced from the shell 204 to define a gap between the rotor connector 206 and the shell 204.

A band 208 is coupled to both the drum 202 and to the rotor 40. The band 208 includes and is manufactured from a metal, such as but not limited to spring steel. The band 208 may include a frictional material disposed on an exterior surface of the band 208 for engaging the shell 204 in frictional engagement as described in greater detail below. The band 208 includes a first end 210 and a second end 212. The first end 210 of the band 208 is coupled to both the drum 202 and the rotor 40. Similarly, the second end 212 of the band 208 is also coupled to both the drum 202 and the rotor 40.

The drum 202 defines a first drum slot 214 that extends angularly about the longitudinal axis 28. The first drum slot 214 is disposed on a radially outer wall of the drum 202. The first end 210 of the band 208 extends through the first drum slot 214 to couple the first end 210 of the band 208 and the drum 202 together. The rotor connector 206 defines a first rotor slot 216 that extends about the longitudinal axis 28. The first rotor slot 216 is disposed on a radially outer wall of the rotor connector 206. The first end 210 of the band 208 extends through the first rotor slot 216 to couple the first end 210 of the band 208 and the rotor 40 together.

The drum 202 defines a second drum slot 218 that extends about the longitudinal axis 28. The second drum slot 218 is disposed on the radially outer wall of the drum 202. The second end 212 of the band 208 extends through the second drum slot 218 to couple the second end 212 of the band 208 and the drum 202 together. The rotor connector 206 defines a second rotor slot 220 that extends about the longitudinal axis 28. The second rotor slot 220 is disposed on the radially outer wall of the rotor connector 206. The second end 212 of the band 208 extends through the second rotor slot 220 to couple the second end 212 of the band 208 and the rotor 40 together. The first drum slot 214 and the first rotor slot 216 are at least partially overlapping. Similarly, the second drum slot 218 and the second rotor slot 220 are at least partially overlapping. Furthermore, the first drum slot 214 and the first rotor slot 216 are disposed adjacent a first axial end 222 of the torque transmitting mechanism 200 along the longitudinal axis 28, and the second drum slot 218 and the second rotor slot 220 are disposed adjacent a second axial end 224 of the torque transmitting mechanism 200 along the longitudinal axis 28.

As best shown in FIGS. 5 and 6, the first end 210 and the second end 212 of the band 208 are bent to form an approximate one hundred eighty degree bend, substantially defining a hooked end to prevent the band 208 from withdrawing from the first drum slot 214, second drum slot 218, first rotor slot 216, and/or second rotor slot 220.

The band 208 is wrapped around the rotor connector 206 and the drum 202 to define at least one complete wrap 226 that completely encircles the rotor connector 206 and the drum 202. Preferably, the band 208 is wrapped around the rotor connector 206 and the drum 202 between 4 and 12 complete revolutions to define between 4 and 12 wraps 226 that completely encircle the rotor connector 206 and the drum 202. The band 208 moves between a disengaged state and an engaged state. When in the disengaged state, the band 208 is loosely wound about the rotor connector 206 and the drum 202, but not frictionally engaged with either the rotor connector 206 or the shell 204 so as to not transmit torque between the drum 202 and the shell 204. The band 208 rotates with the drum 202 and the second member 26 when the band 208 is disposed in the disengaged state, in which the band 208 is not biased against the shell 204. When in the engaged state, the band 208 is un-wound to radially expand the band 208 into frictional engagement with an interior surface of the shell 204, thereby coupling the drum 202 and the shell 204.

Referring to FIGS. 4 and 5, the band 208 is shown in the disengaged state. Referring to FIG. 6, in response to an electric current applied to the stator 38, the rotor 40 and the rotor connector 206 rotate about the longitudinal axis 28. The rotor connector 206 rotates relative to the first end 210 and the second end 212 of the band 208 until one of the first end 210 and the second end 212 contacts and engages an end of one of the first rotor slot 216 and the second rotor slot 220 respectively, at which time the first end 210 or the second end 212 rotates with the rotor connector 206. Referring to FIG. 6, the first end 210 is shown contacting and engaging the first rotor slot 216. As the one of the first end 210 or the second end 212 that is engaged with the rotor connector 206 rotates with the rotor connector 206, the first end 210 and the second end 212 will move within the first drum slot 214 and the second drum slot 218 respectively until the one of the first end 210 and the second end 212 contacts and engages an end of the first drum slot 214 or the second drum slot 218 respectively, at which time the drum 202 rotates with the rotor connector 206. As shown in FIG. 6, the second end 212 is contacting and engaging the second drum slot 218. As the rotor connector 206 continues to rotate, the band 208 is un-wound and radially expanded outward into tight frictional engagement with an inner surface of the shell 204 to couple the shell 204 and the drum 202 together in torque transmitting communication.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. A transmission for a vehicle, the transmission comprising:
   a housing;
   a first member and a second member, with each of the first member and the second member supported by the housing and aligned with each other along a longitudinal axis, wherein at least one of the first member and the second member is rotatable about the longitudinal axis relative to the housing; and
   a torque transmitting mechanism selectively interconnecting the first member and the second member for torque transmission therebetween, the torque transmitting mechanism including:
      a drum attached to one of the first member and the second member and concentrically disposed about the longitudinal axis;
      a shell attached to another of the first member and the second member and concentrically disposed about the longitudinal axis and the drum, wherein the shell is radially spaced from the drum relative to the longitudinal axis;

an electric motor including a stator fixed in position relative to the housing, and a rotor rotatable about the longitudinal axis relative to the stator; and a band having a first end and a second end, wherein the first end is coupled to either the shell and the rotor, or the drum and the rotor, wherein the second end is coupled to either the shell and the rotor, or the drum and the rotor, and wherein the band is wrapped to define at least one wrap completely encircling the drum;

wherein rotation of the rotor in response to an electric current applied to the stator moves the at least one wrap of the band into frictional engagement with one of the drum or the shell to transmit torque between the first member and the second member.

2. A transmission as set forth in claim 1 wherein both the first member and the second member are rotatable about the longitudinal axis relative to the housing.

3. A transmission as set forth in claim 1 where in the band is wrapped around the drum to define between 4 and 12 wraps completely encircling the drum.

4. A transmission as set forth in clam 1 wherein the band includes and is manufactured from a metal.

5. A transmission as set forth in claim 1 further comprising a rotor connector attached to and rotatable with the rotor about the longitudinal axis.

6. A transmission as set forth in claim 5 wherein rotation of the rotor in response to the electric current winds the at least one wrap of the band tightly around and into frictional engagement with the drum.

7. A transmission as set forth in claim 6 wherein the band includes a length measured between the first end of the band and the second end of the band, wherein the length of the band provides at least two millimeters (2 mm) of clearance between each wrap of the band and the drum when the band is in a disengaged state in which the band is not tightened against the drum.

8. A transmission as set forth in claim 6 wherein the rotor connector is concentrically disposed about the longitudinal axis and the shell, and wherein the rotor connector is radially spaced outward of the shell relative to the longitudinal axis.

9. A transmission as set forth in claim 8 wherein the shell defines a first shell slot extending about the longitudinal axis, with the first end of the band extending through the first shell slot to couple the first end of the band and the shell together, and wherein the shell defines a second shell slot extending about the longitudinal axis, with the second end of the band extending through the second shell slot to couple the second end of the band and the shell together.

10. A transmission as set forth in claim 9 wherein the rotor connector defines a first rotor slot extending about the longitudinal axis, with the first end of the band extending through the first rotor slot to couple the first end of the band and the rotor connector together, and wherein the rotor connector defines a second rotor slot extending about the longitudinal axis, with the second end of the band extending through the second rotor slot to couple the second end of the band and the rotor together.

11. A transmission as set forth in claim 10 wherein the first shell slot and the first rotor slot are at least partially overlapping, and wherein the second shell slot and the second rotor slot are at least partially overlapping.

12. A transmission as set forth in claim 5 wherein rotation of the rotor in response to the electric current un-winds the at least one wrap of the band to expand the band radially outward against and into frictional engagement with the shell.

13. A transmission as set forth in claim 12 wherein the rotor connector is concentrically disposed about the longitudinal axis and the drum, and wherein the rotor connector is radially spaced outward of the drum relative to the longitudinal axis, and radially spaced inward of the shell relative to the longitudinal axis.

14. A transmission as set forth in claim 13 wherein the drum defines a first drum slot extending about the longitudinal axis, with the first end of the band extending through the first drum slot to couple the first end of the band and the drum together, and wherein the drum defines a second drum slot extending about the longitudinal axis, with the second end of the band extending through the second drum slot to couple the second end of the band and the drum together.

15. A transmission as set forth in claim 14 wherein the rotor connector defines a first rotor slot extending about the longitudinal axis, with the first end of the band extending through the first rotor slot to couple the first end of the band and the rotor connector together, and wherein the rotor connector defines a second rotor slot extending about the longitudinal axis, with the second end of the band extending through the second rotor slot to couple the second end of the band and the rotor together.

16. A transmission as set forth in claim 15 wherein the first drum slot and the first rotor slot are at least partially overlapping, and wherein the second drum slot and the second rotor slot are at least partially overlapping.

17. A torque transmitting mechanism for selectively interconnecting a first member and a second member of a transmission for torque transmission therebetween, the torque transmitting mechanism comprising:

a drum attached to one of the first member and the second member and concentrically disposed about a longitudinal axis;

a shell attached to another of the first member and the second member and concentrically disposed about the longitudinal axis and the drum, wherein the shell is radially spaced from the drum relative to the longitudinal axis;

an electric motor including a stator, and a rotor rotatable about the longitudinal axis relative to the stator;

a rotor connector attached to and rotatable with the rotor about the longitudinal axis; and a band having a first end coupled to both the shell and the rotor connector, and a second end coupled to both the shell and the rotor connector, wherein the band is wrapped to define between 4 and 12 complete wraps;

wherein rotation of the rotor in response to an electric current applied to the stator moves the band into frictional engagement with one of the drum and the shell to transmit torque between the first member and the second member.

18. A torque transmitting mechanism as set forth in claim 17 wherein:

the rotor connector is concentrically disposed about the longitudinal axis and the shell, and wherein the rotor connector is radially spaced outward of the shell relative to the longitudinal axis;

the shell defines a first shell slot extending about the longitudinal axis, with the first end of the band extending through the first shell slot to couple the first end of the band and the shell together;

the shell defines a second shell slot extending about the longitudinal axis, with the second end of the band extending through the second shell slot to couple the second end of the band and the shell together;

the rotor connector defines a first rotor slot extending about the longitudinal axis, with the first end of the band extending through the first rotor slot to couple the first end of the band and the rotor connector together;

the rotor connector defines a second rotor slot extending about the longitudinal axis, with the second end of the band extending through the second rotor slot to couple the second end of the band and the rotor together; and rotation of the rotor in response to the electric current winds the at least one wrap of the band tightly around and into frictional engagement with the drum.

19. A torque transmitting mechanism as set forth in claim 17 wherein:

the rotor connector is concentrically disposed about the longitudinal axis and the drum, and wherein the rotor connector is radially spaced outward of the drum relative to the longitudinal axis, and radially spaced inward of the shell relative to the longitudinal axis;

the drum defines a first drum slot extending about the longitudinal axis, with the first end of the band extending through the first drum slot to couple the first end of the band and the drum together;

the drum defines a second drum slot extending about the longitudinal axis, with the second end of the band extending through the second drum slot to couple the second end of the band and the drum together;

the rotor connector defines a first rotor slot extending about the longitudinal axis, with the first end of the band extending through the first rotor slot to couple the first end of the band and the rotor connector together;

the rotor connector defines a second rotor slot extending about the longitudinal axis, with the second end of the band extending through the second rotor slot to couple the second end of the band and the rotor together; and rotation of the rotor in response to the electric current un-winds the at least one wrap of the band to expand the band radially outward against and into frictional engagement with the shell.

* * * * *